July 13, 1926.
E. C. STAFFORD
1,592,012
ELECTRIC SIGNAL AND AIR BRAKE HOSE NIPPLE
Filed March 7, 1921
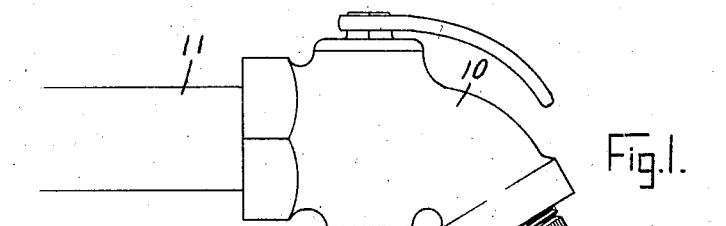
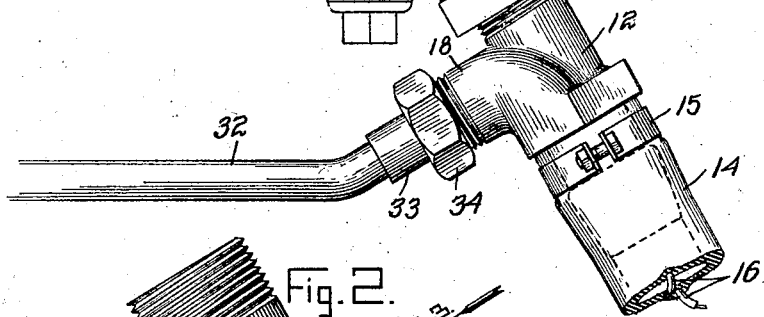
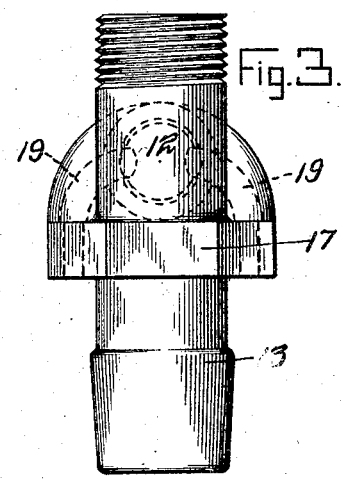
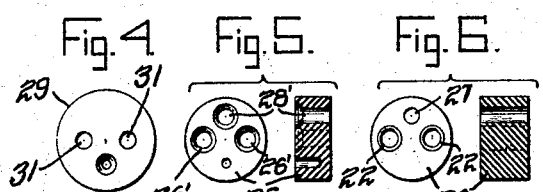
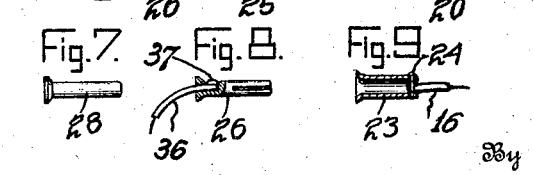
Inventor
Earl C. Stafford
By
Attorney Patented July 13, 1926.

1,592,012

UNITED STATES PATENT OFFICE.

EARL C. STAFFORD, OF PHILADELPHIA, PENNSYLVANIA, ASSIGNOR TO THE UNITED STATES TRAIN SIGNAL COMPANY, OF PORTLAND, MAINE, A CORPORATION OF MAINE.

ELECTRIC SIGNAL AND AIR-BRAKE-HOSE NIPPLE.

Application filed March 7, 1921. Serial No. 450,197.

My said invention relates to a combination electro-pneumatic hose nipple for air brakes and is intended primarily for use as a means for connecting an air-brake hose to an angle cock though not necessarily limited to such use. It is an object of my invention to provide common means for connecting up an air-brake hose and completing an electric circuit through a train.

It is a further object of my invention to provide a connector of the type referred to which shall effectively protect the electric conductors from breakage or impairment due to rain, dust, accidental blows and jars, and the like.

A further object of my invention is to provide a unitary device which shall be inexpensive and effective for its purpose and yet be capable of manufacture by ordinary methods and the parts of which may be easily and quickly connected and disconnected.

Referring to the accompanying drawings which are made a part hereof and on which similar reference characters indicate similar parts, Figure 1 is an elevation of the device in working position, Figure 2, a view of the device partly in section, Figure 3, a view looking in the direction of the arrow in Figure 2, Figure 4, a detail of a part shown in section in Figure 2.

Figures 5 and 6 are side and end views of fiber blocks used in making the electrical connections, Figure 7 is a detail of a polarizing pin, Figure 8 a detail of an electric connector, and Figure 9 a sleeve in which said connector engages.

In the drawings 10 indicates an angle cock connected in ordinary fashion to a section of train pipe 11. A hose nipple 12 is attached to the angle cock by standard pipe threads in the usual manner and this nipple has at its opposite end an annular boss 13 for attachment of a hose section 14 held in place by a clamp 15 in conventional fashion. Preferably the hose section contains wires 16 embedded in the walls thereof although the wires extending from one train unit to another may be supported in other ways.

On the body of the hose nipple is a collar 17 merging into a hollow extension 18, forming a socket. A pair of passages 19 lead through the collar and the extension and into the open central space of said extension. In said space I provide a block 20 held in place by a set screw 21. This block has three openings extending therethrough, of which openings 22 contain sleeves 23 of conducting material to which are attached wires 16 passing from the hose section through passage 19 and attached to the collars by pins 24. Permanent connection of the wires to the sleeves is insured by soldering the wires and pins to the sleeves. The wires are insulated from the nipple in passages 19 by any conventional means such as wrappings of rubber tape or the like. A second block 25 has openings 26' corresponding to openings 22 in block 20. In these openings are positioned slotted pins 26 for engagement with the sleeves 23, these pins forming expansible electrical connectors between the wires soldered thereto and the sleeves 23. The blocks 20 and 25 are made of insulated material, preferably fiber. An opening 27 in block 20 is provided to receive a polarizing pin 28 located in opening 28' of block 25 and acting to prevent crossed connections and thereby to maintain the polarity of the system. A disk 29 rests against the end of the extension 18 and acts to hold the pins 26 and 28 in position, said disk being fixed to block 25 by a screw 30. Holes are provided in the disk at 31 for passage of wires from the conduit 32 to the pins 26. A thimble 33 on the conduit rests against disk 29 and the thimble 33 and disk 29 are held in place by union nut 34.

In use the parts are assembled as shown in Figures 1 and 3, the wires 16 being fixed to block 20 and then inserted through passages 19 so as to bring the block into seating position against a flange 35 (Figure 2). The wires 16 are led into the openings in the walls of hose section 14 which is positioned on the nipple at 13 as shown in Figure 1. The conduit 32 is then positioned as shown in Figure 2 improper positioning being prevented by pin 28. The union nut 34 being now screwed down holds all of the parts firmly in position. When it becomes necessary to remove a section of hose all that need be done is to remove the ordinary coupler and the clamp 15 and pull the hose off the nipple, leaving the wires 16 in place and then replace the hose by a new one in the manner above indicated.

Modifications of my device will occur to those skilled in the art and therefore I do not limit myself to the precise form shown in the drawings and described in the specification, but only as indicated in the appended claims.

Having thus fully described my said invention what I claim as new and desire to secure by Letters Patent, is:

1. A hose nipple for air brakes comprising a body having a collar for abutment against the end of a hose, a lateral extension to engage a conduit for a plurality of electric conductors carried by a train unit, passages through the collar and body and a plurality of conductors carried by the hose and extending through said passages for electrical connection with said first-named conductors, substantially as set forth.

2. A hose nipple having means for attachment of a conducting device for electricity comprising a lateral hollow extension on the nipple, a block seated therein containing sleeves with conductors attached thereto, a removable block also seated in said extension, said block carrying projecting pins to engage in said sleeves, and said pins forming terminals for conductors, a disk attached to said block and holding said pins in place, and means attached to said extension for holding said disk against the end of the extension, substantially as set forth.

3. In a hose nipple, a body having a hollow extension, an insulating block therein, electrical contacts secured to said block, conductors soldered to said contacts, a second block in said extension, pins removably mounted in said block adapted for connection to said conductors, a disk attached to said block to hold the pins in place and a second set of conductors extending through said disk and soldered to said pins, substantially as set forth.

4. In a hose nipple, a body having means at opposite ends respectively for attachment to a hose section and to a train pipe a hollow extension, at one side of the body, an insulating block in said extension, a conduit having conductors attached to said block, means to fasten said conduit in position on the extension, and means connecting said conductors to conductors carried by the hose section, substantially as set forth.

5. A hose nipple for train signal systems comprising a body and a rigid lateral socket thereon, electric conductors passing through said body, means in the extension for holding said conductors in place, a conduit for electrical conductors on a train unit adjacent said body, and detachable means for holding the second named conductors in engagement with the first, substantially as set forth.

6. In an air brake system for trains embodying a train pipe and conductors carried by the train units, a hose nipple having means at opposite ends for attachment to the train pipe and to a hose section, a plurality of conductors in the hose section, a lateral socket on the hose nipple to receive the terminals of conductors on a train unit and individual passages for the different conductors leading from the hose section to said lateral socket, substantially as set forth.

7. In an air brake system for trains embodying a train pipe, a conduit and conductors therein carried by a train unit, a hose nipple bearing means at opposite ends for attachment respectively to the train pipe and to a hose section carrying conductors and means between the ends of the nipple for connecting the conductors in the hose section to those in the conduit, substantially as set forth.

8. In an air brake system embodying a train pipe and an independent conduit for electrical conductors carried by a train unit, the combination of an angle cock, a hose nipple attached thereto, a section of hose having conductors embedded in its walls, a collar on the hose nipple abutting the end of the hose section, an extension on the nipple for connection to the conduit and passages leading through the nipple from said collar to said extension, substantially as set forth.

9. A hose nipple having means at its opposite end for connection to a train pipe and a hose section respectively, a chambered lateral extension on the body to receive the terminals of conductors carried by a train unit, and separate passages leading from the chamber in the lateral extension to points adjacent the end of the hose section for engagement by connectors carried by the hose sections, substantially as set forth.

10. A hose nipple having means at its opposite ends for connection to a train pipe and a hose section respectively, a chambered lateral extension on the body to receive the terminals of a pair of conductors carried by a train unit, passages for a pair of conductors leading from said chamber to the end of the hose section, insulating blocks in said chamber, terminals in said blocks connected to the respective sets of conductors, and a polarizing pin on one block to engage a recess in the other, substantially as set forth.

In witness whereof, I have hereunto set my hand and seal at Washington, District of Columbia, this 19th day of February, A. D. nineteen hundred and twenty-one.

EARL C. STAFFORD. [L. S.]